United States Patent
Madasu et al.

(10) Patent No.: US 11,555,394 B2
(45) Date of Patent: Jan. 17, 2023

(54) CONTROLLING RANGE CONSTRAINTS FOR REAL-TIME DRILLING

(71) Applicant: Landmark Graphics Corporation, Houston, TX (US)

(72) Inventors: Srinath Madasu, Houston, TX (US); Keshava Prasad Rangarajan, Sugar Land, TX (US)

(73) Assignee: Landmark Graphics Corporation, Houston, TX (US)

(*) Notice: Subject to any disclaimer, the term of this patent is extended or adjusted under 35 U.S.C. 154(b) by 243 days.

(21) Appl. No.: 16/957,811

(22) PCT Filed: May 7, 2018

(86) PCT No.: PCT/US2018/031379
§ 371 (c)(1),
(2) Date: Jun. 25, 2020

(87) PCT Pub. No.: WO2019/147297
PCT Pub. Date: Aug. 1, 2019

(65) Prior Publication Data
US 2021/0062634 A1    Mar. 4, 2021

Related U.S. Application Data (60) Provisional application No. 62/623,101, filed on Jan. 29, 2018.

(51) Int. Cl.
*E21B 44/02* (2006.01)
*E21B 45/00* (2006.01)
*G06N 20/00* (2019.01)
*G06N 5/02* (2006.01)

(52) U.S. Cl.
CPC .............. *E21B 44/02* (2013.01); *E21B 45/00* (2013.01); *G06N 5/02* (2013.01); *G06N 20/00* (2019.01); *E21B 2200/22* (2020.05)

(58) Field of Classification Search
CPC ...... E21B 44/02; E21B 45/00; E21B 2200/22; G06N 3/08
See application file for complete search history.

(56) References Cited

U.S. PATENT DOCUMENTS

| | | |
|---|---|---|
| 6,732,052 B2 | 5/2004 | Macdonald et al. |
| 7,172,037 B2 | 2/2007 | Dashevskiy et al. |
| 8,838,426 B2 | 9/2014 | Aldred et al. |
| 9,436,173 B2 | 9/2016 | Wang et al. |
| 9,574,432 B2 | 2/2017 | Ringer et al. |

(Continued)

FOREIGN PATENT DOCUMENTS

| | | | |
|---|---|---|---|
| WO | WO-2016160005 A1 * | 10/2016 | ............. E21B 41/00 |
| WO | 2017083454 | 5/2017 | |

OTHER PUBLICATIONS

CA. Application No. CA3,085,417 , Office Action, dated Dec. 17, 2021, 2 pages.

(Continued)

*Primary Examiner* — Tara Schimpf
(74) *Attorney, Agent, or Firm* — Kilpatrick Townsend & Stockton LLP (57) ABSTRACT

A system and method for controlling a drilling tool inside a wellbore makes use of Bayesian optimization with range constraints. A computing device samples observed values for controllable drilling parameters such as weight-on-bit (WOB) and drill bit rotational speed in RPM and evaluates a selected drilling parameter such a rate-of-penetration (ROP) for the observed values using an objective function. Range constraints can be continuously learned by the computing device as the range constraints change. A Bayesian optimization, subject to the range constraints and the observed values, can produce an optimized value for the controllable drilling parameter to achieve a predicted value for the selected drilling parameter. The system can then control the drilling tool using the optimized value to achieve the predicted value for the selected drilling parameter.

20 Claims, 9 Drawing Sheets

(56) References Cited

U.S. PATENT DOCUMENTS

| | | | |
|---|---|---|---|
| 2009/0114445 | A1 | 5/2009 | Dashevskiy |
| 2011/0225111 | A1* | 9/2011 | Ringer |
| 2014/0277752 | A1* | 9/2014 | Chang .................... E21B 44/00 |
| | | | 700/275 |
| 2015/0081222 | A1 | 3/2015 | Laing et al. |
| 2015/0247396 | A1 | 9/2015 | Tunc et al. |
| 2015/0252664 | A1 | 9/2015 | Astrid et al. |
| 2018/0025269 | A1 | 1/2018 | Dursun et al. |

OTHER PUBLICATIONS

CA. Application No. CA3,085,417, Office Action, dated Jun. 30, 2021, 4 pages.
GB. Application No. GB2007841.6, "First Examination Report", dated Dec. 7, 2021, 3 pages.
Snoek et al., "Scalable Bayesian Optimization Using Deep Neural Networks", ICML'15: Proceedings of the 32nd International Conference on International Conference on Machine Learning, vol. 37, Jul. 13, 2015, 13 pages.
Berkenkamp et al., "Bayesian Optimization with Safety Constraints: Safe and Automatic Parameter Tuning in Robotics", Learning & Adaptive Systems Group, Department of Computer Science, Robotics, arXiv:1602.04450v1 [cs.RO], Feb. 14, 2016, 9 pages.
Dunlop et al., "Optimizing ROP through Automation", Drilling Contractor, available online at https://www.slb.com/~/media/Files/drilling/industry_articles/201109_dc_opt_rop_through_automation_ia.pdf, Sep./Oct. 2011, 5 pages.
International Application No. PCT/US2018/031379, "International Search Report and Written Opinion", dated Nov. 15, 2018, 12 pages.

\* cited by examiner

CONTROLLING RANGE CONSTRAINTS FOR REAL-TIME DRILLING

TECHNICAL FIELD

The present disclosure relates generally to wellbore drilling. More specifically, but not by way of limitation, this disclosure relates to real-time control of a drilling tool during wellbore drilling.

BACKGROUND

A well (e.g., an oil or gas well) includes a wellbore drilled through a subterranean formation. The conditions inside the subterranean formation where the drill bit is passing when the wellbore is being drilled continuously change. For example, the formation through which a wellbore is drilled exerts a variable force on the drill bit. This variable force can be due to the rotary motion of the drill bit, the weight applied to the drill bit, and the friction characteristics of each strata of the formation. A drill bit may pass through many different materials, rock, sand, shale, clay, etc., in the course of forming the wellbore and adjustments to various drilling parameters are sometimes made during the drilling process by a drill operator to account for observed changes.

DETAILED DESCRIPTION

Certain aspects and features relate to a system that improves, and makes more efficient, the projection of an optimized value for a selected drilling parameter, such as rate of penetration (ROP), by adjusting controllable parameters, such as weight-on-bit (WOB) and drill bit rotational speed, for drilling operations. The controllable parameters can be computed, taking into account range constraints, and the parameters can be utilized for real-time, closed-loop control and automation in drilling to maintain the optimized value for the selected drilling parameter.

In some examples, observations during optimization can be updated. Certain aspects and features use Bayesian optimization while continuously learning and taking into account range constraints imposed by the physical characteristics of the drilling setup and formation to quickly and accurately project optimum controllable drilling parameters for drilling optimization. The system can project optimized controllable drilling parameters in a given amount of time with less computing power and storage and can thus drive optimization faster and with a smaller number of sampling points as compared to approaches that do not update observations during optimization and that rely on storing and accessing range constraint information for many possible drilling conditions. Alternatively, processing time can be reduced. Additionally, the system more likely to converge to the correct solution.

In some examples, a system includes a drilling tool and a computing device in communication with the drilling tool. The computing device can include instructions that are executable by the computing device to cause the computing device to sample observed values for at least one controllable drilling parameter and evaluate a selected drilling parameter for the observed values using an objective function. Engineering constraints can be evaluated by the computing device to determine range constraints. A Bayesian optimization process, subject to the range constraints and the observed values, can be run to produce an optimized value for the controllable drilling parameter to achieve a predicted value for the selected drilling parameter. The system can then apply the optimized value for the controllable drilling parameter to the drilling tool to achieve the predicted value for the selected drilling parameter.

Figure 1:
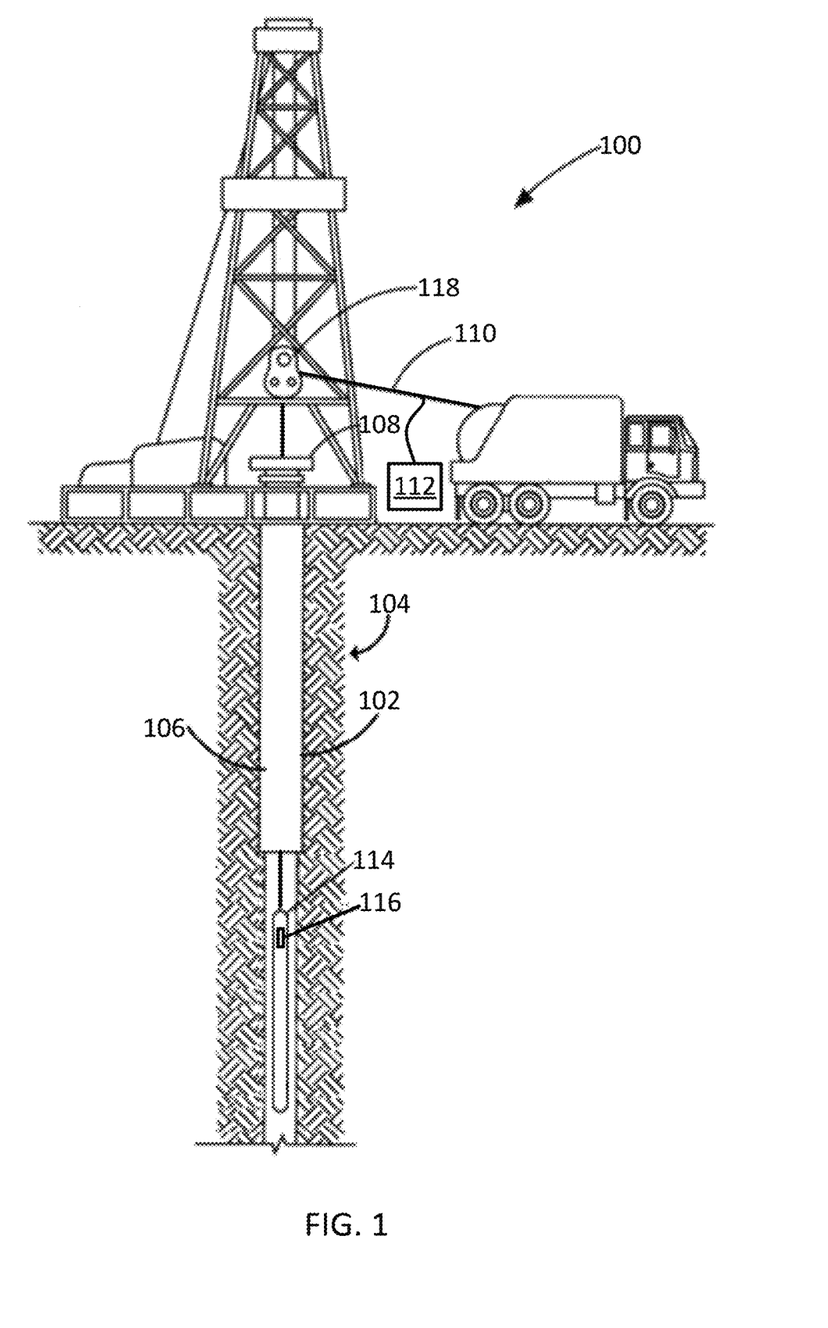
FIG. 1 is a cross-sectional view of an example of a well system that includes a system for controlling a drilling tool according to some aspects.

FIG. 1 is a cross-sectional side view of an example of a well system 100 according to some aspects. The well system 100 includes a wellbore 102 extending through a hydrocarbon bearing subterranean formation 104. In this example, the wellbore 102 is vertical, but in other examples, the wellbore 102 can additionally or alternatively be horizontal or deviated.

In this example, the wellbore 102 includes a casing string 106 (e.g., a metal casing) extending from the well surface 108 into the subterranean formation 104. The casing string 106 can provide a conduit via which formation fluids, such as production fluids produced from the subterranean formation 104, can travel from the wellbore 102 to the well surface 108. In other examples, the wellbore 102 can lack the casing string 106.

The wellbore 102 can include a drilling tool 114 for extending the wellbore 102. Additional tools can also be included, such as a safety tool, valve tool, packer tool, monitoring tool, formation-testing tool, a logging-while-drilling tool, or any combination of these. In some examples, a tool is deployed in the wellbore 102 using a wireline 110, slickline, or coiled tube, which can be wrapped around a winch 118 or pulley at the well surface 108.

The well system 100 can also include a computing device 112. The computing device 112 can be positioned at the well surface 108 or elsewhere (e.g., offsite). The computing device 112 may be in communication with the drilling tool 114, a sensor, or another electronic device. For example, the computing device 112 can have a communication interface for transmitting information to and receiving information from another communication interface 116 of the drilling tool 114.

In some examples, the computing device 112 can receive information from downhole (or elsewhere) in substantially real time, which can be referred to as real-time data. The real-time data can include information related to the well system 100. For example, the drilling tool 114 can stream real-time data to the computing device 112, where the real-time data includes information about the orientation or location of the drilling tool 114 in the wellbore 102, or the ROP, WOB, or rotational speed of the drilling tool 114 through the wellbore 102. The computing device 112 can use the real-time data at least in part to teach a deep-learning neural network and supply observed values to an optimizer, which a well operator may use to determine one or more controllable parameters for performing an operation in the well system 100. For example, the computing device 112 can use the real-time data to teach a deep-learning neural network optimizer that can be used for Bayesian optimization to provides a predicted value for a selected drilling parameters such as ROP for the drilling tool 114 through the subterranean formation 104. The Bayesian optimization can also provide predicted controllable parameters to be applied to drilling tool 114. A more specific example of the computing device 112 is described in greater detail below with respect to FIG. 2.

Figure 2:
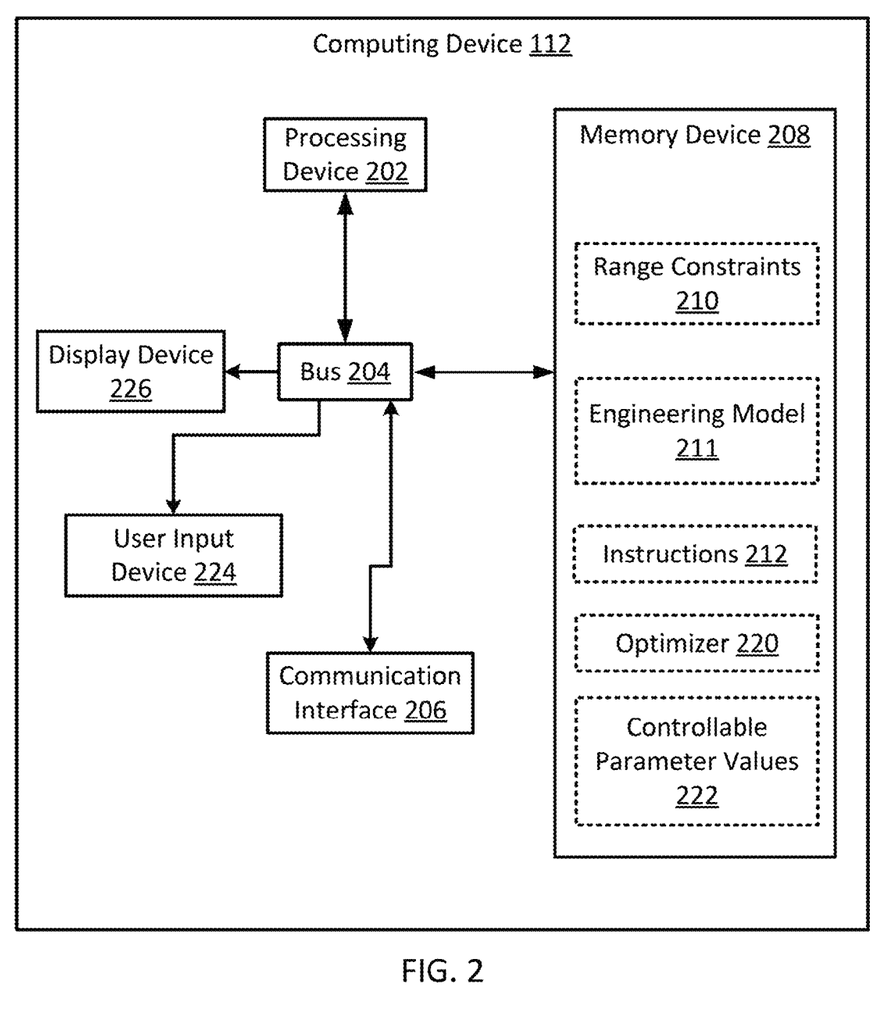
FIG. 2 is block diagram of a computing device for controlling a drilling tool according to some aspects.

FIG. 2 depicts an example of a computing device 112. The computing device 112 can include a processing device 202, a bus 204, a communication interface 206, a memory device 208, a user input device 224, and a display device 226. In some examples, some or all of the components shown in FIG. 2 can be integrated into a single structure, such as a single housing. In other examples, some or all of the components shown in FIG. 2 can be distributed (e.g., in separate housings) and in communication with each other.

The processing device 202 can execute one or more operations for optimizing parameters for controlling a wellbore operation. The processing device 202 can execute instructions stored in the memory device 208 to perform the operations. The processing device 202 can include one processing device or multiple processing devices. Non-limiting examples of the processing device 202 include a field-programmable gate array ("FPGA"), an application-specific integrated circuit ("ASIC"), a microprocessing device, etc.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory computer-readable medium from which the processing device 202 can read instructions. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In this example, the memory device 208 includes range constraints 210. The memory device 208 in this example also includes an engineering model 211 to provide engineering constraints imposed by the drilling environment that can be accessed and used to continuously determine, evaluate, and learn the range constraints. In this example, the memory device 208 includes computer program code instructions 212 for acquiring data and controlling the drilling tool 114. The memory device 208 in this example includes an optimizer 220. The optimizer can be, for example, computer program code instructions to implement a deep-learning neural network to perform Bayesian optimization of the selected drilling parameter and produce optimum values for controllable parameters. Results from the optimizer can be stored as controllable parameter values 222 in the memory device 208.

In some examples, the computing device 112 includes a communication interface 206. The communication interface 206 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 112 includes a user input device 224. The user input device 224 can represent one or more components used to input data. Examples of the user input device 224 can include a keyboard, mouse, touchpad, button, or touch-screen display, etc.

In some examples, the computing device 112 includes a display device 226. The display device 226 can represent one or more components used to output data. Examples of the display device 226 can include a liquid-crystal display (LCD), a television, a computer monitor, a touch-screen display, etc. In some examples, the user input device 916 and the display device 226 can be a single device, such as a touch-screen display.

Figure 3:
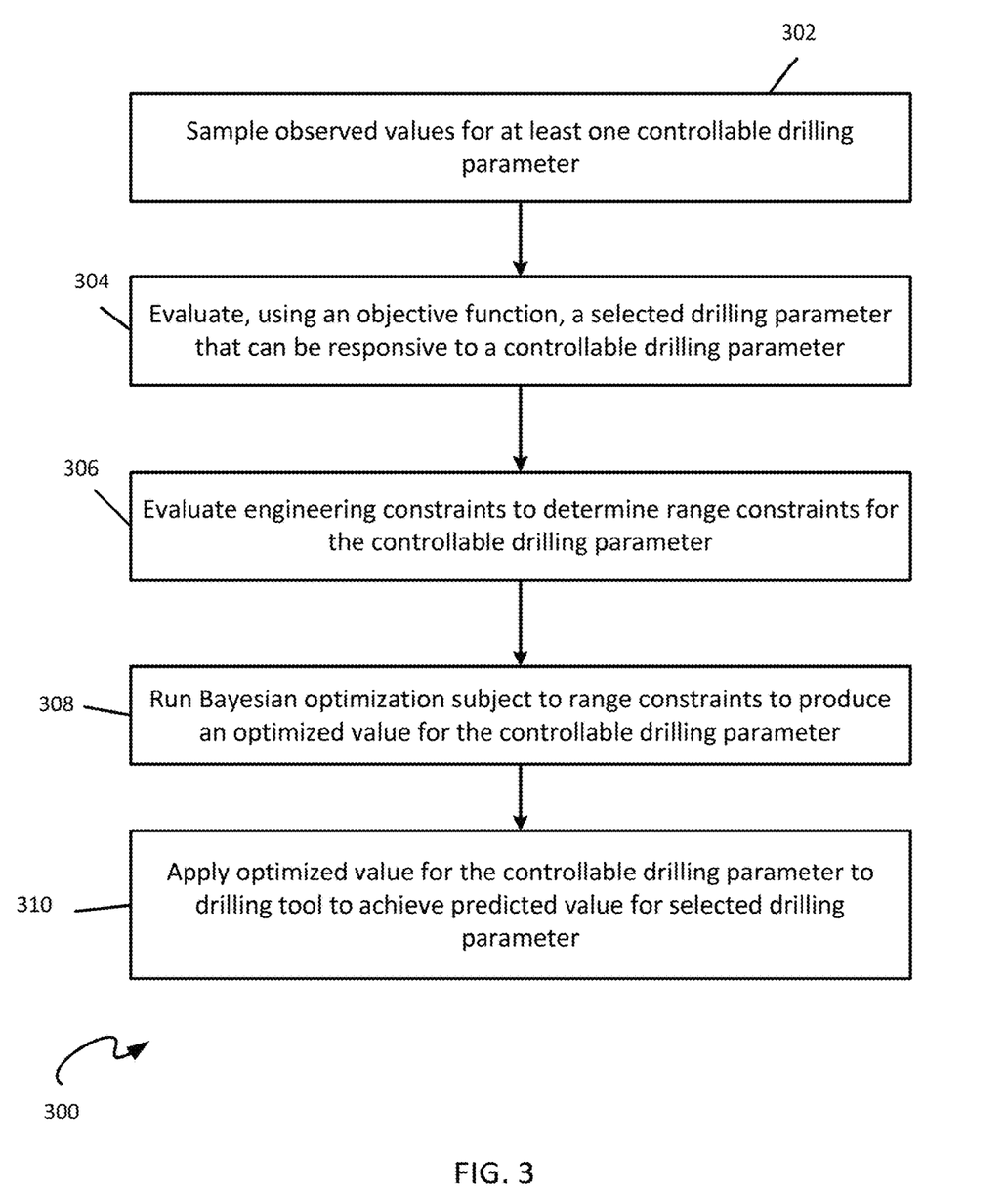
FIG. 3 is a flowchart illustrating a process for controlling a drilling tool according some aspects.

FIG. 3 is a flowchart illustrating an example process 300 for controlling a drilling tool according some aspects. The process 300 is carried out in some aspects by computer program instructions 212. At block 302 of process 300, computing device 112 begins sampling of observed values for a controllable drilling parameter or multiple controllable drilling parameters. As an example, computing device 112 can sample these value from interface 116 of drilling tool 114. At block 304, processing device 202 of computing device 112 evaluates a selected drilling parameter using the observed values for the controllable drilling parameters and an objective function. In some aspects, the objective function is a loss function and the loss function is maximized. At block 306, processing device 202 evaluates engineering constraints using the engineering model 211 to determine range constraints for the controllable drilling parameter or parameters. The engineering model 211 can be supplied, as examples, through user input device 224 or communication interface 206 of computing device 112.

Range constraints are numerical values for parameters that are programmatically prohibited. Range constraints are based on physical engineering constraints, which are in turn based on physical properties of the drilling environment, which includes the drill string and formation. Engineering constraints are nonlinear. The physical properties of the drill string and formation manefest themselves, as examples, in torque and drag, whirl, and maximum pumping rate of drilling fluids. Whirl is a disruptive resonance in the drill-string at certain rotational drill speeds. RPM values around these speeds must usually be avoided. Pumping rate can be a constraint because there is a maximum rate at which debris-filled fluid can be removed from the wellbore. Torque and drag restraints may be imposed by forces exerted on the drill bit by friction with the subterranean formation in which the wellbore is being formed. Some range constraints can change with the drill string configuration and the nature of the formation. For example, RPM values can change with the length and depth of the drillstring.

Still referring to FIG. 3, at block 308, computing device 112, using processing device 202 runs a Bayesian optimization subject to the range constraints and the observed values of controllable drilling parameters to produce optimized values for the controllable drilling parameters to achieve a predicted value for the selected drilling parameter. In some aspects, the Bayesian optimization includes setting the objective function to zero during the optimization. In some aspects, the Bayesian optimization is run using optimizer 220 of computing device 112. The optimized controllable drilling parameters may be stored as controllable parameter values 222 in memory device 208. In some aspects, the Bayesian optimization uses a deep-learning neural network, for example, stored as a portion of optimizer 220 in memory device 208 of computing device 112. At block 310 of process 300, the processing device 202 applies the optimized values for the controllable drilling parameter or parameters to the drilling tool to achieve the predicted value for the selected drilling parameter.

In some aspects, the predicted value is produced by applying the deep-learning neural network to perform the Bayesian optimization using observed values for the controllable drilling parameter received at multiple observation times. The predicted value of the response variable, the selected drilling parameter, can be one of a sequence of predicted values. The deep-learning neural network is taught using the observed values of controllable parameters. The deep-learning neural network can include convolutional layers that follow the relationship between the controllable parameters and the selected drilling parameter. The remaining figures illustrate three different example processes using a system like that discussed above to update observations during Bayesian optimization. In these examples, ROP is the selected drilling parameter while WOB and drill bit rotational speed (RPM) are the controllable parameters.

Figure 4:
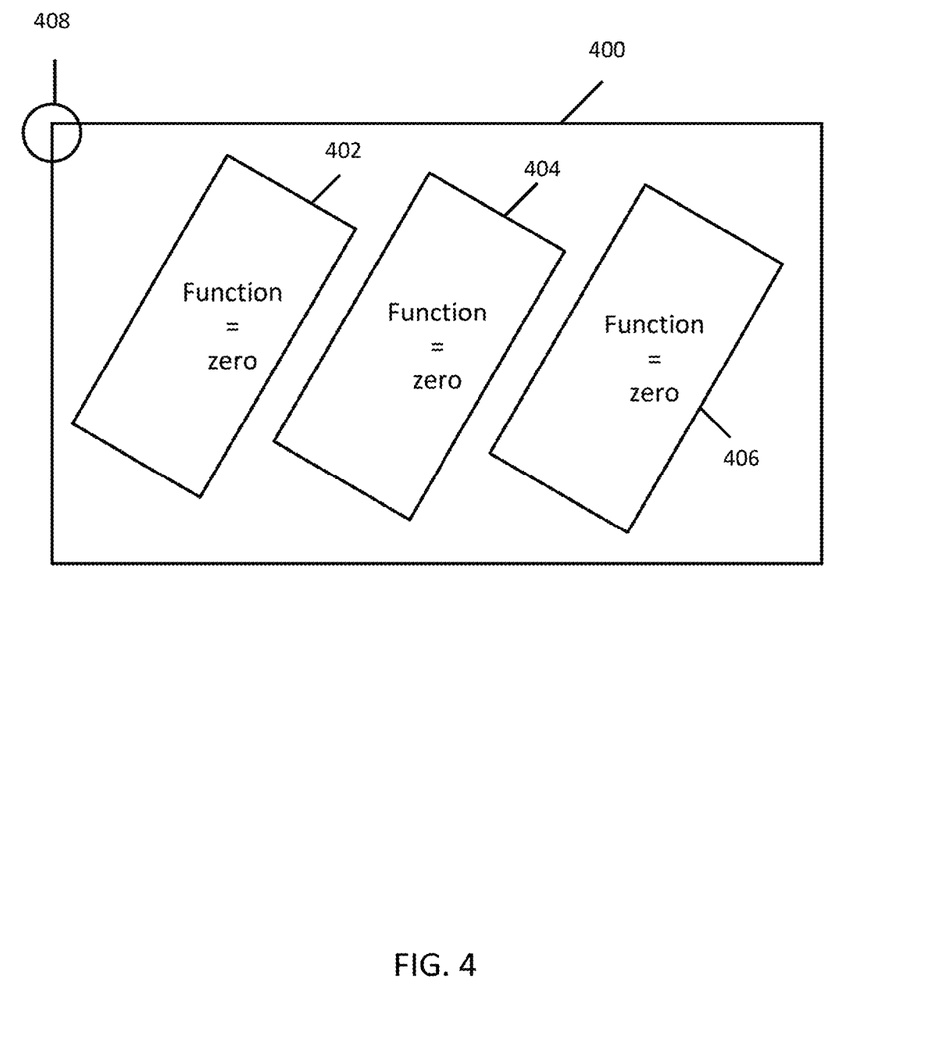
FIG. 4 is a graphical representation of a response variable space that is used in a system for controlling a drilling tool according to some aspects.

FIG. 4 is a graphical representation of a response variable space 400 defined by WOB and drill bit rotational speed (RPM) that is used in a system for controlling a drilling tool according to some aspects. In this example, the loss function is set to zero when values for the controllable parameters WOB and RPM are within range constraint areas 402, 404, and 406 while the Bayesian optimization is run. Response variable space 400 shows an optimized value 408 for the two controllable parameters to produce an optimal ROP for this example. The loss function is zeroed every time a value is sampled within the range constraints so that the deep-learning neural network continuously learns the range constraints over time and can automatically avoid values within the range constraints.

Figure 5:
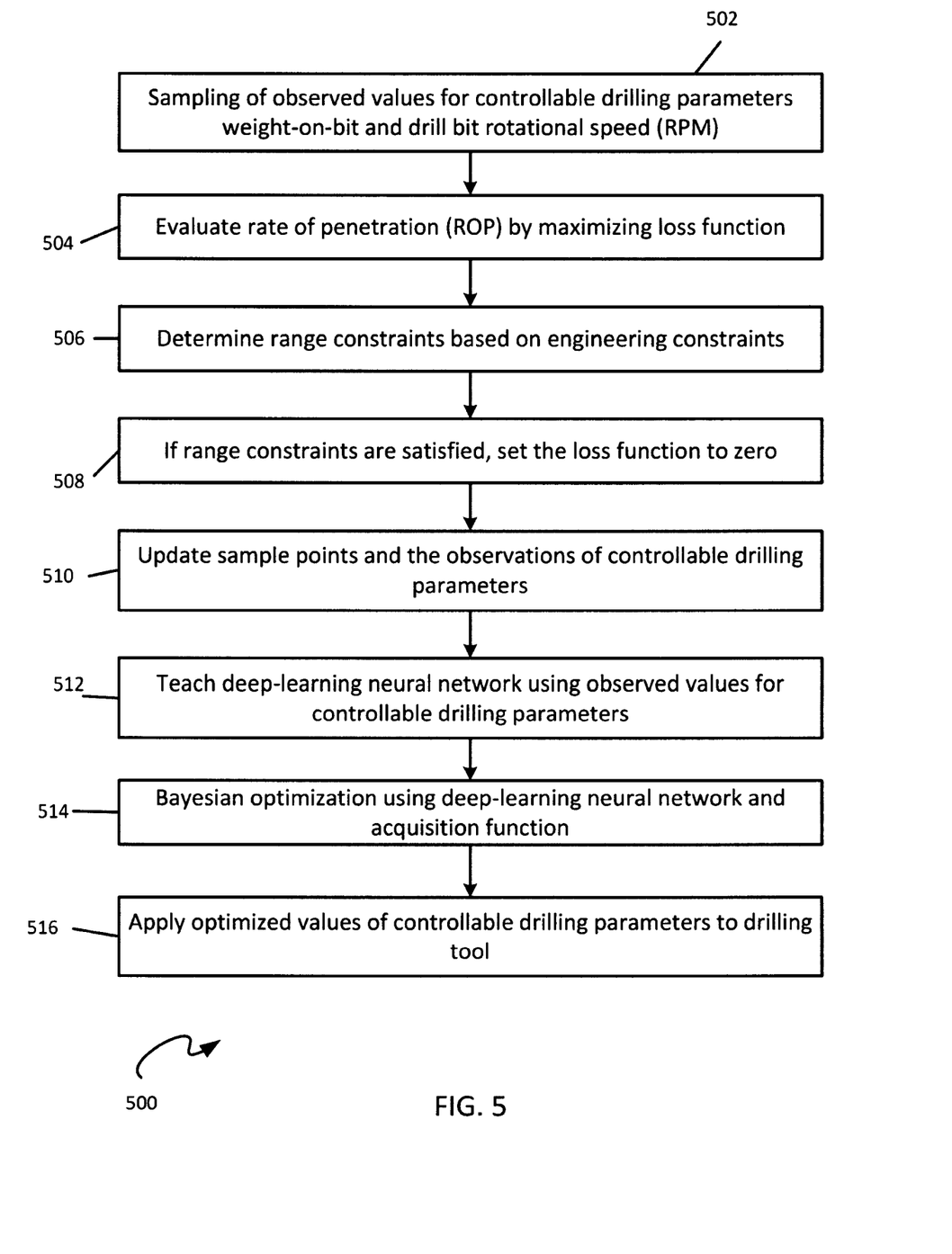
FIG. 5 is a flowchart illustrating a process for controlling a drilling tool using the response variable space illustrated in FIG. 4 according to some aspects.

FIG. 5 is a flowchart illustrating a process 500 for controlling a drilling tool using the response variable space illustrated in FIG. 4 according to some aspects. At block 502 of process 500, for each of a number of observations, values for WOB and RPM are sampled. At block 504, the selected drilling parameter, ROP in this example, is evaluated by maximizing the loss function using the observed values for WOB and RPM. At block 506, range constraint areas 402, 404, and 406 for WOB and RPM are determined using engineering constraints. Blocks 508, 510, 512, and 514 detail an example of running the Bayesian optimization of block 308 of FIG. 3 using program instructions 212 and optimizer 220 of computing device 112. Inputs to optimizer 220 are the response variable space 400 for WOB and RPM, the engineering constraints, and the loss function. At block 508, when the range constraints are satisfied, the processing device 202 sets the loss function to zero. At block 510, sample points and observed values for WOB and RPM are updated. At block 512, the deep-learning neural network of optimizer 220 is taught using the updated observed values for the controllable drilling parameters WOB and RPM, and the values are optimized at block 514 using Bayesian optimization with an acquisition function. At block 516, the optimized values for WOB and RPM are applied to the drilling tool to achieve a predicted, optimized value for ROP.

Figure 6:
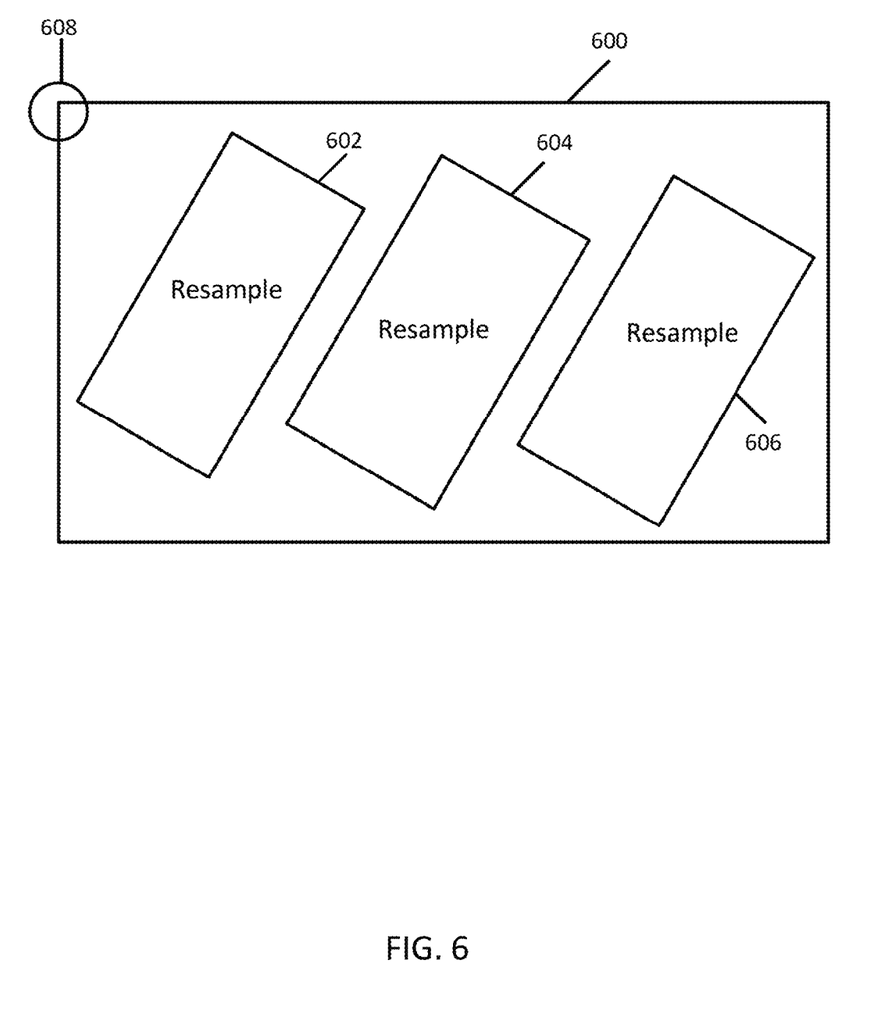
FIG. 6 is a graphical representation of another response variable space that is used in a system for controlling a drilling tool according to some aspects.

FIG. 6 is a graphical representation of a response variable space 600 defined by WOB and RPM. In this example, the loss function not set to zero when values for the controllable parameters WOB and RPM are within range constraint areas 602, 604, and 606, rather observed values are resampled while the Bayesian optimization is run without setting the loss function to zero. Response variable space 600 shows an optimized value 608 for the two controllable parameters to produce an optimal ROP for this example. The resampling within range constraint areas 602, 604, and 606 teaches the deep-learning neural network to avoid values within the range constraints.

Figure 7:
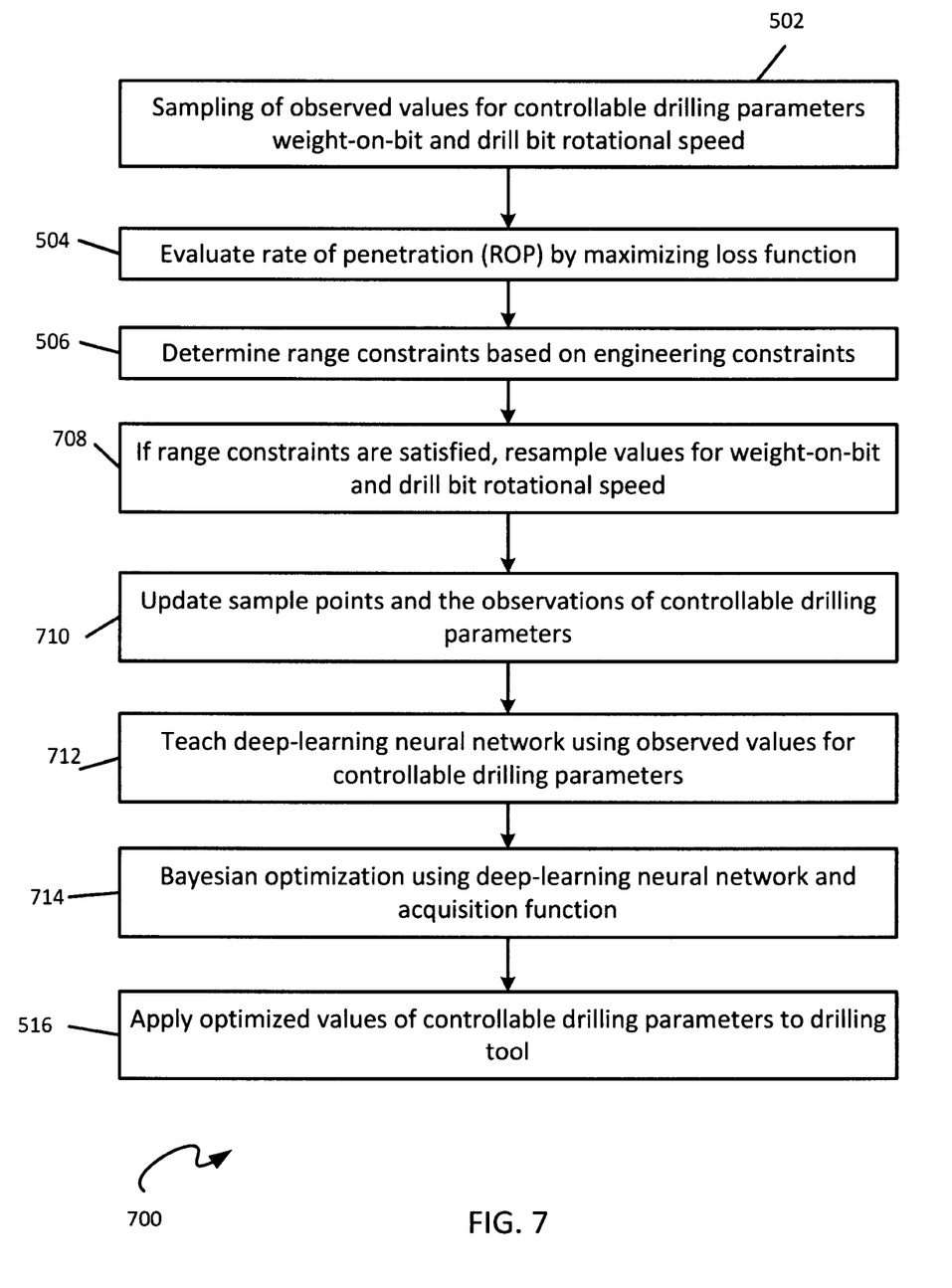
FIG. 7 is a flowchart illustrating a process for controlling a drilling tool using the response variable space illustrated in FIG. 6 according to some aspects.

FIG. 7 is a flowchart illustrating a process 700 for controlling a drilling tool using the response variable space illustrated in FIG. 6 according to some aspects. Process blocks 502, 504, and 506 of process 700 are implemented in the same manner as with process 500 discussed above with respect to FIG. 5. Blocks 708, 710, 712, and 714 detail an example of running the Bayesian optimization of block 308 of FIG. 3 using program instructions 212 and optimizer 220 of computing device 112, where inputs to optimizer 220 are the response variable space 600 for WOB and RPM, the engineering constraints, and the loss function. At block 708, when the range constraints are satisfied, the processing device 202 resamples observed values for the controllable drilling parameters of WOB and RPM. At block 710, sample points and observed values for WOB and RPM are updated. At block 712, the deep-learning neural network of optimizer 220 is taught using the updated observed values for the controllable drilling parameters WOB and RPM, and the values are optimized at block 714 using Bayesian optimization with an acquisition function. At block 516, the optimized values for WOB and drill bit rotational speed are applied to the drilling tool to achieve a predicted, optimized value for ROP just as in FIG. 5.

Figure 8:
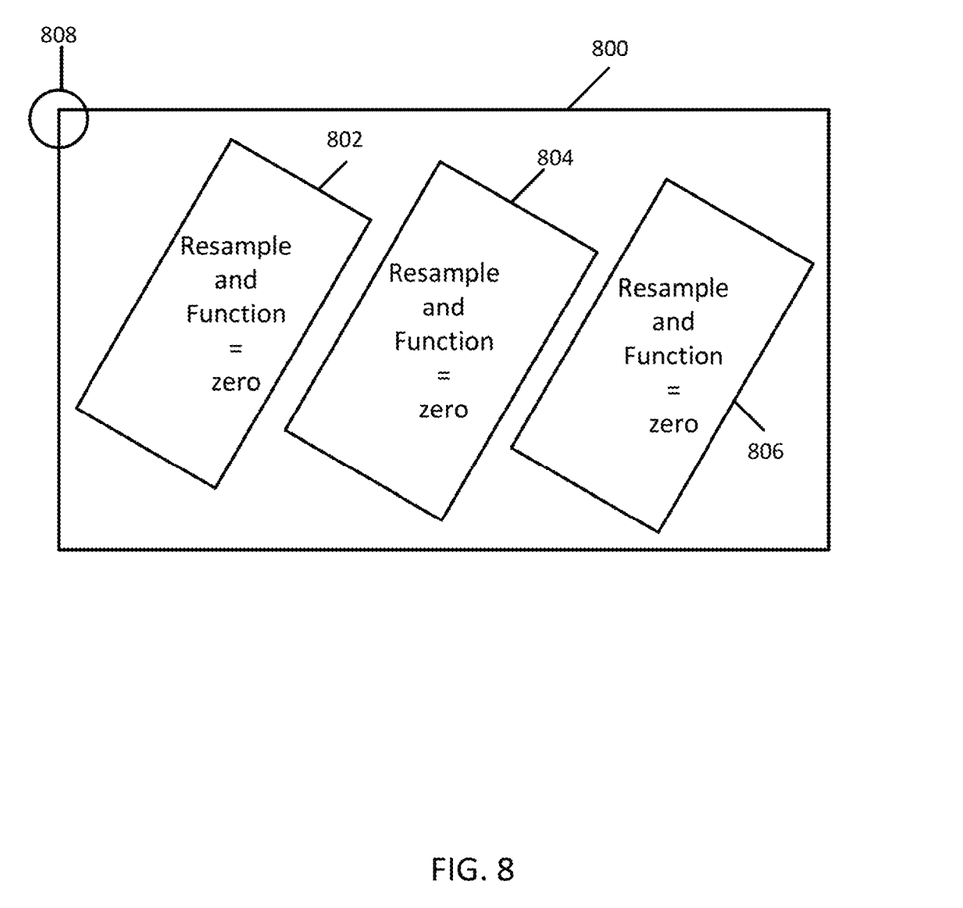
FIG. 8 is a graphical representation of an additional response variable space that is used in a system for controlling a drilling tool according to some aspects.

FIG. 8 is a graphical representation of a response variable space 800 defined by WOB and RPM that is used in a system for controlling a drilling tool according to some aspects. In this example, the loss function is set to zero and the observed values are resampled when values for the controllable parameters WOB and RPM are within range constraint areas 802, 804, and 806 while the Bayesian optimization is run. Response variable space 800 shows an optimized value 808 for the two controllable parameters to produce an optimal ROP for this example. The loss function is zeroed and resampling is carried out every time a value is sampled within the range constraints so that the deep-learning neural network learns to avoid values within the range constraints.

Figure 9:
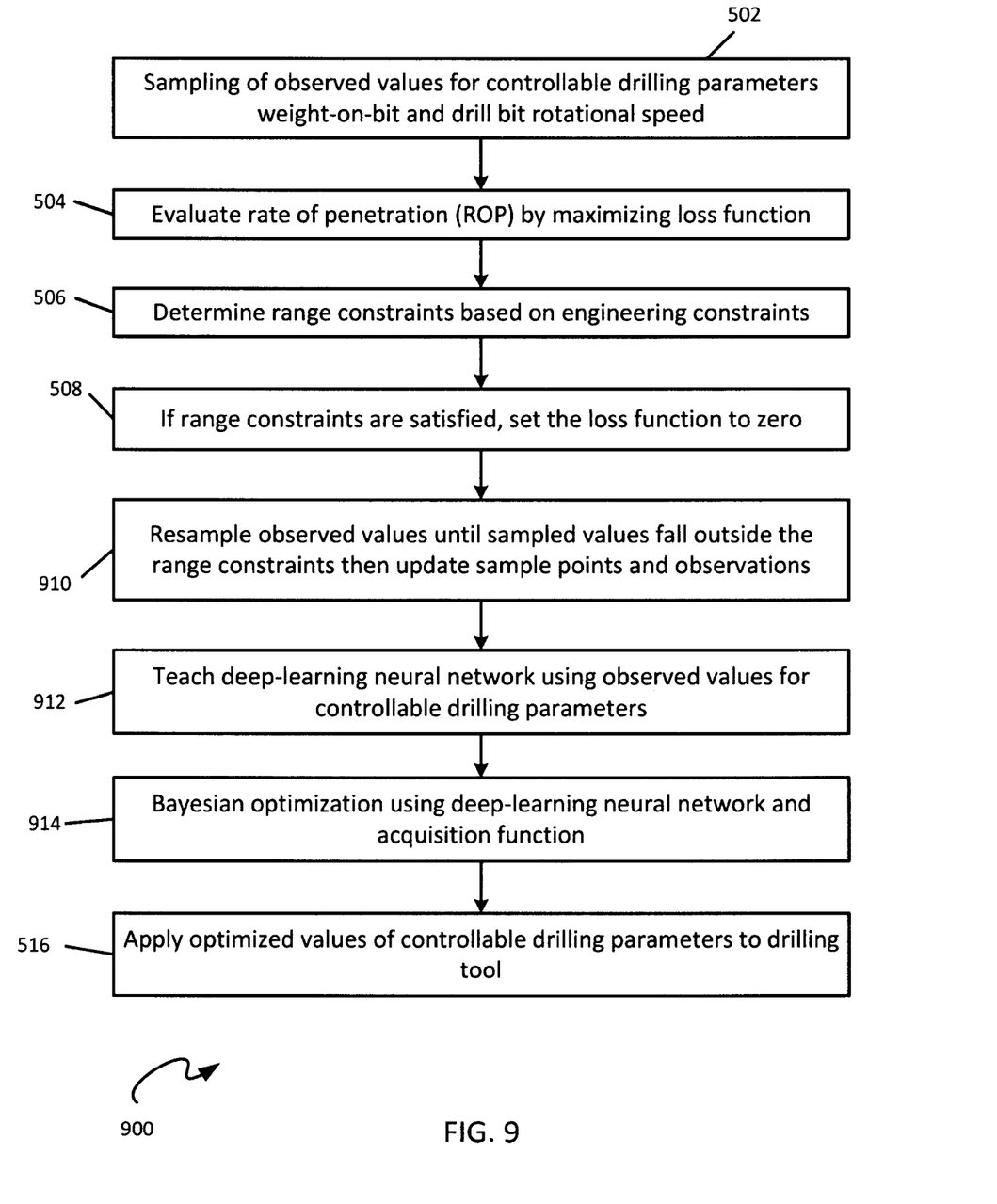
FIG. 9 is a flowchart illustrating a process for controlling a drilling tool using the response variable space illustrated in FIG. 8 according to some aspects.

FIG. 9 is a flowchart illustrating a process 900 for controlling a drilling tool using the response variable space illustrated in FIG. 8 according to some aspects. At block 502 of process 500, for each of a number of observations, values for WOB and RPM are sampled. At block 504, the selected drilling parameter, ROP in this example, is evaluated by maximizing the loss function using the observed values for WOB and RPM. At block 506, range constraint areas 802, 804, and 806 for WOB and RPM are determined using engineering constraints. Blocks 508, 910, 912, and 914 detail an example of running the Bayesian optimization of block 308 of FIG. 3 using program instructions 212 and optimizer 220 of computing device 112. Inputs to optimizer 220 are the response variable space 800 for WOB and RPM, the engineering constraints, and the loss function. At block 508, when the range constraints are satisfied, the processing device 202 sets the loss function to zero. At block 910, sample points and observed values for WOB and RPM are resampled and then updated. At block 912, the deep-learning neural network of optimizer 220 is taught using the updated observed values for the controllable drilling parameters WOB and RPM, and the values are optimized at block 914 using Bayesian optimization with an acquisition function. At block 516, the optimized values for WOB and RPM are applied to the drilling tool to achieve a predicted, optimized value for ROP.

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, systems and methods for controlling range constraints for real-time drilling are provided according to one or more of the following examples. As used below, any reference to a series of examples is to be understood as a reference to each of those examples disjunctively (e.g., "Examples 1-4" is to be understood as "Examples 1, 2, 3, or 4").

Example #1. A system includes a drilling tool and a computing device in communication with the drilling tool and the computing device including a non-transitory memory device including instructions that are executable by the computing device to cause the computing device to perform operations. The operations include sampling observed values for at least one controllable drilling parameter, determining range constraints based on physical properties of a drilling environment, executing a Bayesian optimization subject to the range constraints and the observed values to produce an optimized value for the at least one controllable drilling parameter to achieve a predicted value for the selected drilling parameter, and controlling the drilling tool using the optimized value for the at least one controllable drilling parameter to achieve the predicted value for the selected drilling parameter.

Example #2. The system of example 1 wherein the operations further include teaching a deep-learning neural network using the observed values and running the Bayesian optimization using the deep-learning neural network.

Example #3. The system of example(s) 1-2 wherein the operations further include setting an objective function to zero when the range constraints are satisfied and updating the observed values for the at least one controllable drilling parameter while the objective function is set to zero.

Example #4. The system of example(s) 1-3 wherein the operations further include resampling the observed values when the range constraints are satisfied and updating the observed values for the at least one controllable drilling parameter.

Example #5. The system of example(s) 1-4 wherein the operations further include setting an objective function to zero and resampling the observed values when the range constraints are satisfied and updating the observed values for the at least one controllable drilling parameter.

Example #6. The system of example(s) 1-5 wherein the selected drilling parameter is evaluated by maximizing an objective function.

Example #7. The system of example(s) 1-6 wherein the selected drilling parameter includes rate-of-penetration and the at least one controllable drilling parameter comprises at least one of weight-on-bit or drill bit rotational speed.

Example #8. A method includes sampling, by a processing device, observed values for at least one controllable drilling parameter, determining, by the processing device, range constraints based on physical properties of a drilling environment, running, by the processing device, a Bayesian optimization subject to the range constraints and the observed values to produce an optimized value for the at least one controllable drilling parameter to achieve a predicted value for the selected drilling parameter, and controlling, by the processing device, the drilling tool using the optimized value for the at least one controllable drilling parameter to achieve the predicted value for the selected drilling parameter.

Example #9. The method of example 8 further further includes teaching a deep-learning neural network using the observed values and running the Bayesian optimization using the deep-learning neural network.

Example #10. The method of example(s) 8-9 further includes setting an objective function to zero when the range constraints are satisfied; and updating the observed values for the at least one controllable drilling parameter while the objective function is set to zero.

Example #11. The method of example(s) 8-10 further includes resampling the observed values when the range constraints are satisfied and updating the observed values for the at least one controllable drilling parameter.

Example #12. The method of example(s) 8-11 further includes setting an objective function to zero and resampling the observed values when the range constraints are satisfied, and updating the observed values for at least one controllable drilling parameter when.

Example #13. The method of example(s) 8-12 wherein the selected drilling parameter is evaluated by maximizing an objective function.

Example #14. The method of example(s) 8-13 wherein the selected drilling parameter comprises rate-of-penetration and the at least one controllable drilling parameter comprises at least one of weight-on-bit or drill bit rotational speed.

Example #15. A non-transitory computer-readable medium that includes instructions that are executable by a processing device for causing the processing device to perform a method according to any of examples 8-14.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a drilling tool; and
a computing device in communication with the drilling tool, the computing device including a non-transitory memory device comprising instructions that are executable by the computing device to cause the computing device to perform operations comprising:
sampling observed values for at least one controllable drilling parameter;
determining range constraints based on physical properties of the drilling tool and of a drilling environment, the physical properties including whirl, torque and drag, and maximum pumping rate;
executing a Bayesian optimization subject to the range constraints and the observed values to produce an optimized value for the at least one controllable drilling parameter to achieve a predicted value for a selected drilling parameter of the at least one controllable drilling parameter; and
controlling the drilling tool using the optimized value for the at least one controllable drilling parameter to achieve the predicted value for the selected drilling parameter.

2. The system of claim 1 wherein the operations further comprise:
teaching a deep-learning neural network using the observed values; and
running the Bayesian optimization using the deep-learning neural network.

3. The system of claim 1 wherein the operations further comprise:
setting an objective function to zero when the range constraints are satisfied; and
updating the observed values for the at least one controllable drilling parameter while the objective function is set to zero.

4. The system of claim 1 wherein the operations further comprise:
resampling the observed values when the range constraints are satisfied; and
updating the observed values for the at least one controllable drilling parameter.

5. The system of claim 1 wherein the operations further comprise:
setting an objective function to zero and resampling the observed values when the range constraints are satisfied; and
updating the observed values for at least one controllable drilling parameter.

6. The system of claim 1 wherein the selected drilling parameter is evaluated by maximizing an objective function.

7. The system of claim 1 wherein the selected drilling parameter comprises rate-of-penetration and the at least one controllable drilling parameter comprises at least one of weight-on-bit or drill bit rotational speed.

8. A method comprising:
sampling, by a processing device, observed values for at least one controllable drilling parameter;
determining, by the processing device, range constraints based on physical properties of a drilling tool and of a drilling environment, the physical properties including whirl, torque and drag, and maximum pumping rate;
running, by the processing device, a Bayesian optimization subject to the range constraints and the observed values to produce an optimized value for the at least one controllable drilling parameter to achieve a predicted value for a selected drilling parameter of the at least one controllable drilling parameter; and
controlling, by the processing device, the drilling tool using the optimized value for the at least one controllable drilling parameter to achieve the predicted value for the selected drilling parameter.

9. The method of claim 8 further comprising:
teaching a deep-learning neural network using the observed values; and
running the Bayesian optimization using the deep-learning neural network.

10. The method of claim 8 further comprising:
setting an objective function to zero when the range constraints are satisfied; and
updating the observed values for the at least one controllable drilling parameter while the objective function is set to zero.

11. The method of claim 8 further comprising:
resampling the observed values when the range constraints are satisfied; and
updating the observed values for the at least one controllable drilling parameter.

12. The method of claim 8 further comprising:
setting an objective function to zero and resampling the observed values when the range constraints are satisfied; and
updating the observed values for at least one controllable drilling parameter.

13. The method of claim 8 wherein the selected drilling parameter is evaluated by maximizing an objective function.

14. The method of claim 8 wherein the selected drilling parameter comprises rate-of-penetration and the at least one controllable drilling parameter comprises at least one of weight-on-bit or drill bit rotational speed.

15. A non-transitory computer-readable medium that includes instructions that are executable by a processing device for causing the processing device to perform a method comprising:
sampling observed values for at least one controllable drilling parameter;
determining range constraints based on physical properties of a drilling tool and of a drilling environment, the physical properties including whirl, torque and drag, and maximum pumping rate;
running a Bayesian optimization subject to the range constraints and the observed values to produce an optimized value for the at least one controllable drilling parameter to achieve a predicted value for a selected drilling parameter of the at least one controllable drilling parameter; and
controlling the drilling tool using the optimized value for the at least one controllable drilling parameter to achieve the predicted value for the selected drilling parameter.

16. The non-transitory computer-readable medium of claim 15 wherein the method further comprises:

teaching a deep-learning neural network using the observed values; and running the Bayesian optimization using the deep-learning neural network.

17. The non-transitory computer-readable medium of claim 15 wherein the method further comprises:

setting an objective function to zero when the range constraints are satisfied; and updating the observed values for the at least one controllable drilling parameter while the objective function is set to zero.

18. The non-transitory computer-readable medium of claim 15 wherein the method further comprises:

resampling the observed values when the range constraints are satisfied; and updating the observed values for the at least one controllable drilling parameter.

19. The non-transitory computer-readable medium of claim 15 wherein the method further comprises:

setting an objective function to zero and resampling the observed values when the range constraints are satisfied; and updating the observed values for at least one controllable drilling parameter.

20. The non-transitory computer-readable medium of claim 15 wherein the selected drilling parameter is evaluated by maximizing an objective function.

* * * * *